United States Patent [19]

Suhm

[11] 4,103,924
[45] Aug. 1, 1978

[54] VEHICLE SAFETY DEVICE

[76] Inventor: Richard R. Suhm, 21380 Lorain Ave., Fairview Park, Ohio 44126

[21] Appl. No.: 747,715

[22] Filed: Dec. 6, 1976

[51] Int. Cl.² .............................................. B62J 5/00
[52] U.S. Cl. .............................. 280/289 R; 116/28 R; 350/99
[58] Field of Search ................. 280/289 R; 116/28 R, 116/173; 40/145 R; 350/99, 97

[56] References Cited

U.S. PATENT DOCUMENTS

| | | | |
|---|---|---|---|
| 2,701,540 | 2/1955 | Hamilton | 350/99 |
| 2,797,621 | 7/1957 | Gladen | 350/99 |
| 3,374,763 | 3/1968 | Browning | 350/99 |
| 3,758,190 | 9/1973 | Douglas | 350/97 |
| 4,041,452 | 8/1977 | Moya | 116/28 R |

Primary Examiner—Joseph F. Peters, Jr.
Assistant Examiner—Donn McGiehan
Attorney, Agent, or Firm—Teare, Teare & Sammon

[57] ABSTRACT

A vehicle safety device, such as for use with a bicycle, adapted to be mounted adjacent the rear end thereof. The device includes an upstanding flexible mounting shaft, preferably made of a polymeric material, detachably connected at one end to the vehicle and at the other end adapted to mount a signal device. The device includes a symmetrical, irregularly shaped body in transverse cross section having a plurality of integral, radially extending blade-like elements for aerodynamically spinning the body about a vertical axis during operation of the vehicle.

4 Claims, 4 Drawing Figures

VEHICLE SAFETY DEVICE

BACKGROUND OF THE INVENTION

The present invention relates to safety devices, and more particularly relates to a vehicle safety device, such as for bicycles or the like, which is adapted to be detachably mounted adjacent the rear end thereof to provide a safety and warning signal for oncoming traffic.

Presently, with the increased demand for and popularity of vehicles, such as bicycles, motorcycles, or the like, there has been a similar need for warning and/or signal devices for use therewith. Heretofor, various types of objects, such as reflectors, or flags, have been employed for this purpose. Such devices have generally included light colored reflectors, or flags, mounted by supporting wands or rods mounted adjacent the rear of the vehicle so as to not interfere with the rideroperator. For example, one such flag-type arrangement is disclosed in U.S. Pat. No. 3,947,059.

Heretofor, such prior devices have not been completely satisfactory. Purely reflective type devices are generally helpful during night usage, but do not incorporate features which draw one's attention to same during daytime usage. Similarly, flag-type devices have the disadvantage, for example, that when becoming wet or moist, they have a tendency to stick, and hence, often do not provide the degree of movement required to attract the attention of oncoming traffic.

SUMMARY OF THE INVENTION

The present invention provides a vehicle safety device such as for bicycles, motorcycles, or the like, which is of a rugged, simple construction for quick and easy attachment and removal to the vehicle frame adjacent the rear axle thereof. The device includes an elongated flexible shaft, preferably made from a polymeric material which is adapted to be attached at one end to the vehicle frame and at the other end adapted to mount the body of the signal device. The body of the device is of an elongated construction which has a new and novel cross-sectional configuration. This cross-sectional structure, in transverse section, includes a plurality of integral, radially extending blade-like elements which are aerodynamically smoothly curved so as to rapidly spin the body about a vertical axis upon forward movement of the vehicle.

The device is of an economical, light weight construction which can readily spin at relatively high rotational velocities upon forward movement of the vehicle. The body of of the device is adapted to mount bright colored indicia, such as a luminescent candy-striped design, or the like, to provide an adequate signal during daytime or nighttime usage thereof.

DESCRIPTION OF THE PREFERRED EMBODIMENTS

Figure 1:
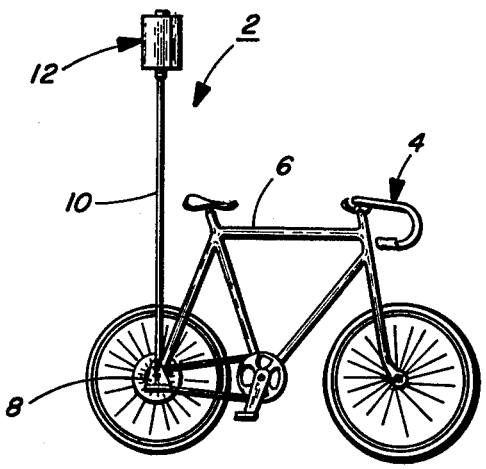
FIG. 1 is a side elevational view illustrating the safety device of the present invention detachably mounted on a vehicle, such as a bicycle.

Referring again to the drawings, and in particular to FIG. 1 thereof, there is illustrated a vehicle safety device, designated generally at 2, of the invention shown mounted on a vehicle 4, such as a bicycle or the like. As shown, the device 2 is detachably mounted adjacent the rear end of the bicycle on the frame thereof. It is to be understood, however, that the device of the invention may be employed in other types of vehicles, such as motorcycles, scooters, and other types of cycles, as well as other 4-wheel vehicles, such as race cars, dune buggies or the like.

In the embodiment shown, the device 2 may be detachably mounted on the vehicle frame 6 via a bracket 8. The bracket 8 may be detachably connected to the rear axle by any suitable manner, as known in the art. As shown, the device generally includes an elongated mounting shaft 10 which is detachably mounted at one end to the bracket 8 and at the other end constructed and arranged to mount the body 12 of the device.

Figure 2:
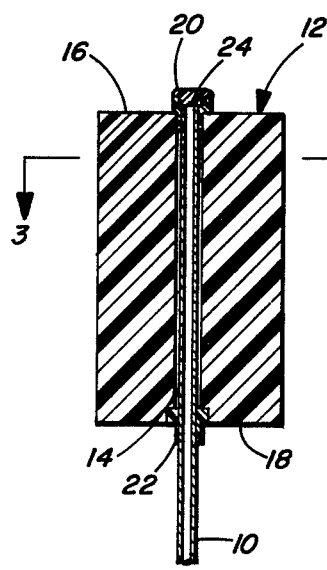
FIG. 2 is a fragmentary, enlarged vertical section view of the safety device.
Figure 3:
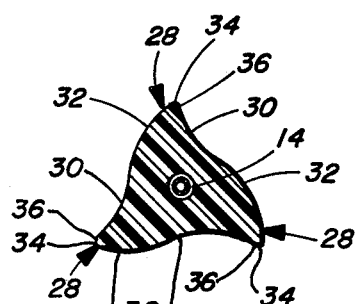
FIG. 3 is a horizontal section view taken along the line 3—3 of FIG. 2.

As best seen in FIG. 2, the body 12 of the device is of an elongated construction which has an axial extending passageway 14 extending therethrough which opens onto the opposed generally flat ends 16 and 18 of the body 12. The passageway 14 is adapted to slidably receive one end of the shaft 10 and, hence, has a diameter slightly greater than the corresponding diameter of the shaft. As shown, an outer cap 20 may be provided to act as a journal for attaching one end of the shaft to the body 12. Another bearing sleeve 22 may be provided at the other end for securement to the body 12. The journal, or bearing member 20 and 22 are fixedly attached to the material of the body with the shaft 10 being adapted for free rotation therein. The upper journal has a detachable cap 24 for locking the upper end of the shaft 10 to the journal 20. By this arrangement, the body is free to rotate or spin about the vertical axis of the shaft 10 and is held in place via the journals 20 and 22 and cap 24.

In accordance with the invention, the body 12 of the device 2 preferably has a unique cross-sectional configuration for aerodynamically spinning the body about the aforesaid rotational axis. In the form shown, the body preferably has a symmetrical, generally starshaped configuration defined by a plurality of integral blade-like elements 28 which extend radially from the geometric center thereof. In this form, the blade-like elements are defined by continuous surfaces, including a first concave surface 30 and a second convex surface 32 which terminate in sharp terminal end edges 34. Preferably, the radius of the surface 30 is slightly greater than that of the surface 32 so as to define a relatively abrupt recess angle 36 at the juncture point of the surfaces 30 and 32 defining the edge 34.

Figure 4:
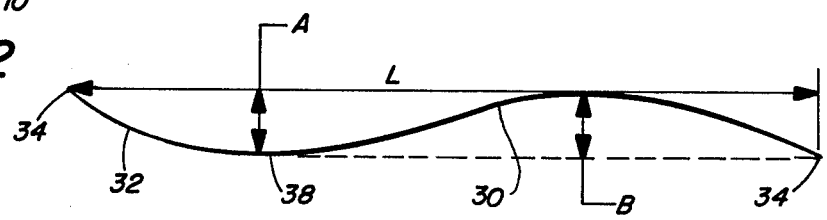
FIG. 4 is a diagrammatic illustration illustrating the contour of the device.

In FIG. 4, there is illustrated a typical example of a profile contour of the surfaces 30 and 32 defining the blade-like elements 28. In such case, the transverse distance L between the terminal edges 34 may be approximately 5 inches, with the altitude being approximately 7/16 inch on the convex surface 32, with the altitude B on the concave surface being approximately 7/16 inch, and with the mid-point 38 on the convex surface 32 being spaced approximately 3½ inches from the opposed terminal edge 34 on the adjacent concave surface so as to define the recess angle 36, as aforesaid. By this arrangement, there is provided optimum aerodynamic characteristics for maximizing the rotational velocity of the body 12 about its rotational axis. In this case, the rotational axis of the body comprises the geometric center of the body.

In the invention, the body 12 may be made of a solid construction comprised of a polymeric material. In such case, the polymeric material preferably includes a polyurethane rigid foam material. Also, the body may be made of a hollow construction of a plastic material, such as by extruding or other forming techniques, as known in the art. Similarly, the shaft 10 can be made of a hollow construction or it can be made of a solid plastic stock, as desired.

I claim:

1. A vehicle safety device adapted for detachable connection on a vehicle, such as a bicycle or the like, comprising
    an elongated shaft member adapted to be detachably connected to said vehicle,
    an elongated body member detachably mounted adjacent the opposite end of said shaft member,
    the elongated portion of the body defining alternating convex and concave surfaces wherein a plurality of the convex surfaces blend at one end into an adjacent concave surface and at the other end combine with a non-parallel concave surface to form blade-like terminal end edges,
    support means for rotatably mounting said body on said shaft member for rotational movement about the vertical axis of said shaft member.

2. A vehicle safety device in accordance with claim 1, wherein said body member is of a generally star-shaped configuration in transverse cross section.

3. A vehicle safety device in accordance with claim 1, wherein said non-parallel concave and convex surfaces together define a generally abrupt recess angle.

4. A vehicle safety device in accordance with claim 3, wherein
    the said recess angle is formed by a relative ratio of convex and concave surfaces whereby the transverse distance between adjacent terminal edges is approximately a factor of five, the altitude of each convex and concave surface is 7/16, and the midpoint on the convex surface is a factor of approximately 3½ from the opposed terminal edge on the adjacent concave surface.

* * * * *